(12) United States Patent
Kurabayashi (10) Patent No.: US 8,886,653 B2
(45) Date of Patent: Nov. 11, 2014

(54) INFORMATION PROCESSING DEVICE, COMPUTER READABLE RECORDING MEDIUM, AND INFORMATION PROCESSING METHOD

(75) Inventor: Noriyuki Kurabayashi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1687 days.

(21) Appl. No.: 12/022,583

(22) Filed: Jan. 30, 2008

(65) Prior Publication Data
US 2008/0294677 A1    Nov. 27, 2008

(30) Foreign Application Priority Data
May 25, 2007 (JP) ................... 2007-139782

(51) Int. Cl.
*G06F 17/30* (2006.01)
*G06F 17/00* (2006.01)
*G06F 3/00* (2006.01)

(52) U.S. Cl.
CPC .......... *G06F 17/30964* (2013.01); *G06F 17/00* (2013.01); *G06F 3/00* (2013.01); *Y10S 715/968* (2013.01)
USPC ........... 707/748; 707/707; 707/708; 707/749; 707/758; 707/780; 715/229; 715/968

(58) Field of Classification Search
USPC ......... 707/609, 723, 726–728, 730, 747–749, 707/750, 694–695, 705–710, 758, 780; 709/203, 215–220; 715/205–210, 262, 715/264, 229, 712–713, 760, 763, 968; 706/45–50
See application file for complete search history.

(56) References Cited

U.S. PATENT DOCUMENTS

| | | | | |
|---|---|---|---|---|
| 6,037,935 A * | 3/2000 | Bates et al. | ................... | 715/760 |
| 6,175,830 B1 * | 1/2001 | Maynard | ................... | 1/1 |
| 6,182,065 B1 * | 1/2001 | Yeomans | ................... | 1/1 |
| 6,549,896 B1 * | 4/2003 | Candan et al. | ................... | 1/1 |

(Continued)

FOREIGN PATENT DOCUMENTS

| | | |
|---|---|---|
| JP | 2001-022749 A | 1/2001 |
| JP | 2002-099568 A | 4/2002 |
| WO | WO 00/68838 | * 11/2000 |

OTHER PUBLICATIONS

Wenpu Xing et al. "Weighted PageRank Algorithm", Proceedings of the Second Annual Conference on Communication Networks and Services Research (CNSR'04), 10 pages.*

(Continued)

*Primary Examiner* — Srirama Channavajjala
(74) *Attorney, Agent, or Firm* — Sughrue Mion, PLLC (57) ABSTRACT

An information processing device includes: a creating unit that extracts link information from content, and creates interpage relationship data which includes information between a subject page and linking pages having links from/to the subject page directly or indirectly; a page weight calculating unit that calculates the weight of at least one of the linking pages, based on the interpage relationship data; a tag weight calculating unit that calculates the weight of a tag, based on the weight of the at least one of the linking pages and information about the tag; a tag transmission determining unit that determines which tag is to be transmitted to which page, based on the tag weight; and a page creating unit that creates a new page having the tag added to the subject page, based on the determination result of the tag transmission determining unit.

14 Claims, 12 Drawing Sheets

(56) References Cited

U.S. PATENT DOCUMENTS

| | | | |
|---|---|---|---|
| 6,763,354 B2* | 7/2004 | Hosken ................................ | 1/1 |
| 2003/0101415 A1* | 5/2003 | Chang ............................ | 715/513 |
| 2004/0193698 A1* | 9/2004 | Lakshminarayana ......... | 709/218 |
| 2007/0198504 A1* | 8/2007 | Feng et al. ........................ | 707/5 |

OTHER PUBLICATIONS

Jongwon Lee et al. "An Effective Keyword Extraction Method for Videos in Web Pages by Analyzing their Layout Structures", IEEE, 2007, 4 pages.*

* cited by examiner

```
procedure traverse(pages:URLList,
                   depth:Integer,
                   maxDepth:Integer)
variable
  curPage:URL
  links:URLList
  allPages:URLList global
begin
  if isEmpty(pages) return;
  if greaterThan(depth, maxDepth) return;
  curPage ::= head(pages);
  add(curPage, allPages);
  links ::= getLinks(curPage);
  for l:URL in links begin
    hasLink(curPage, l) ::= true;
  end
  traverse(links, depth + 1, maxDepth);
  traverse(tail(pages), depth, maxDepth);
end
```

FIG. 4B

```
procedure makePageMatrix()
variable
  allPages:URLList global
begin
  for p:URL in allPages begin
    for q:URL in allPages begin
      if isEqual(p, q)
        put( '0' );
      else if hasLink(p, q) = true
        put ( '1' );
      else
        put( '0' );
    end
  end
end
```

FIG. 5

|   | a | b | c | d | e | f | g | h | i | X |
|---|---|---|---|---|---|---|---|---|---|---|
| a | – | 1 | 1 | 1 | 0 | 0 | 0 | 0 | 0 | 0 |
| b | 0 | – | 0 | 0 | 0 | 1 | 0 | 0 | 0 | 0 |
| c | 0 | 0 | – | 0 | 1 | 0 | 0 | 0 | 0 | 0 |
| d | 0 | 0 | 0 | – | 0 | 0 | 0 | 0 | 0 | 0 |
| e | 0 | 0 | 0 | 0 | – | 1 | 1 | 0 | 0 | 0 |
| f | 0 | 0 | 0 | 0 | 0 | – | 0 | 0 | 0 | 1 |
| g | 0 | 0 | 0 | 0 | 0 | 0 | – | 0 | 0 | 0 |
| h | 0 | 0 | 0 | 0 | 0 | 0 | 0 | – | 1 | 0 |
| i | 0 | 0 | 0 | 0 | 0 | 0 | 0 | 0 | – | 1 |
| X | 0 | 0 | 0 | 0 | 0 | 0 | 0 | 1 | 0 | – |

FIG. 6

| | $d$ | $l_{in}$ | $l_{out}$ | $l_r$ | $w_p$ |
|---|---|---|---|---|---|
| a | 3 | 0 | 3 | 2 | 0.222 |
| b | 2 | 1 | 1 | 1 | 1.000 |
| c | 3 | 1 | 1 | 1 | 0.667 |
| d | --- | 1 | 0 | 0 | 0.000 |
| e | 2 | 1 | 2 | 1 | 0.500 |
| f | 1 | 2 | 1 | 1 | 3.000 |
| g | --- | 1 | 0 | 0 | 0.000 |
| h | 2 | 1 | 1 | 1 | 1.000 |
| i | 1 | 1 | 1 | 1 | 2.000 |

INFORMATION PROCESSING DEVICE, COMPUTER READABLE RECORDING MEDIUM, AND INFORMATION PROCESSING METHOD

CROSS-REFERENCE TO RELATED APPLICATION

This application is based on and claims priority under 35 USC 119 from Japanese Patent Application No. 2007-139782 filed May 25, 2007.

BACKGROUND

1. Technical Field

The present invention relates to an information processing device, a computer readable recording medium, and an information processing method.

2. Related Art

There have been known document sharing systems in which each user adds additional individual information such as personal remarks and comments to online documents and shares the additional individual information with other users.

There have also been WWW (World Wide Web) servers that automatically generate and provide bookmarks especially designed for each of the registered members who access the WWW servers, based on the search and view behaviors of the registered members.

SUMMARY

According to an aspect of the invention, there is provided an information processing device that includes a creating unit that extracts link information from content, and creates interpage relationship data which includes information between a subject page and linking pages having links from/to the subject page directly or indirectly; a page weight calculating unit that calculates the weight of at least one of the linking pages, based on the interpage relationship data; a tag weight calculating unit that calculates the weight of a tag, based on the weight of the at least one of the linking pages and information about the tag; a tag transmission determining unit that determines which tag is to be transmitted to which page, based on the tag weight; and a page creating unit that creates a new page having the tag added to the subject page, based on the determination result of the tag transmission determining unit.

BRIEF DESCRIPTION OF THE DRAWINGS

Exemplary embodiments of the present invention will be described in detail based on the following figures, wherein.

DETAILED DESCRIPTION

The following is a description of an exemplary embodiment of the present invention, with reference to the accompanying drawings.

Figure 1:
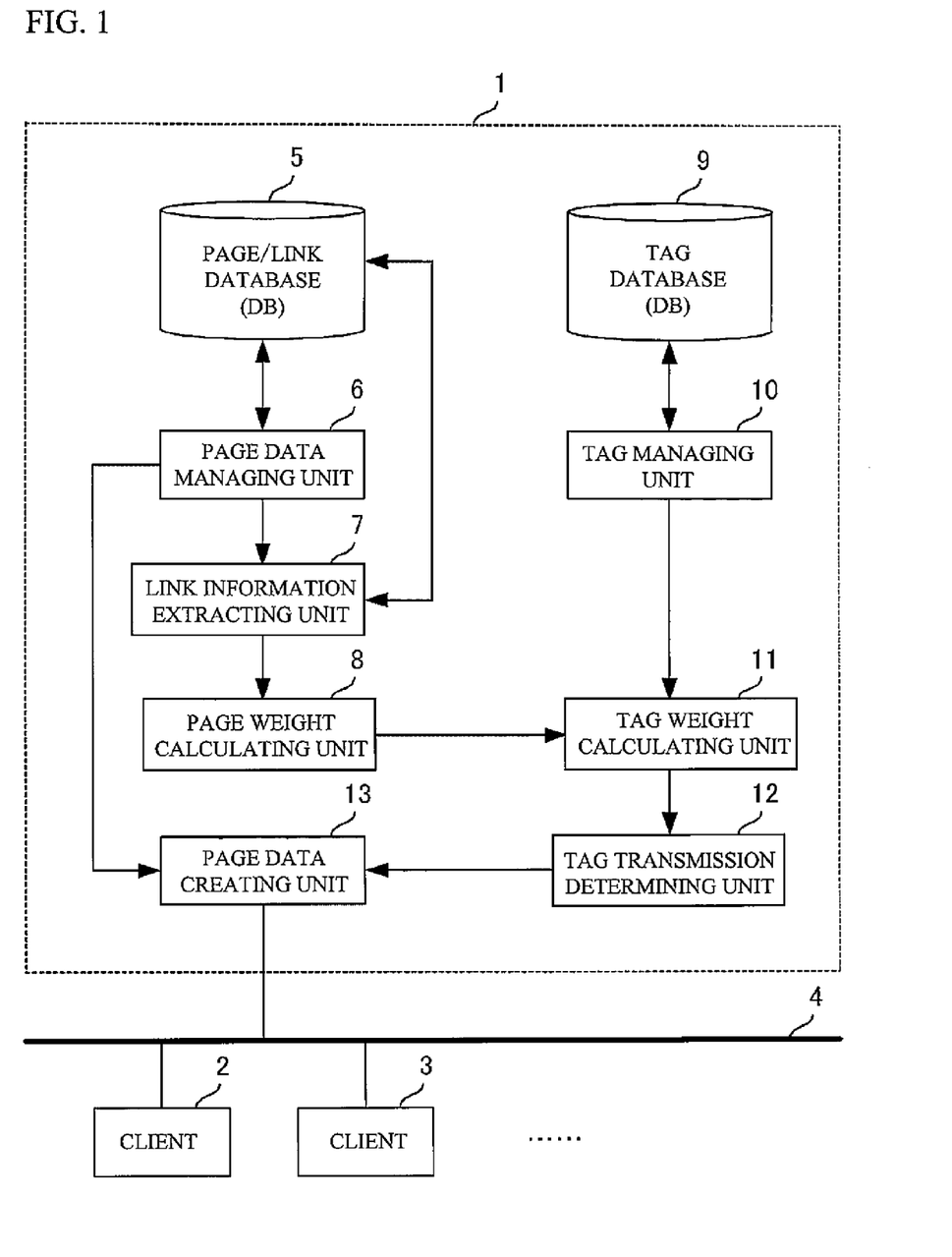
FIG. 1 is a block diagram showing the structure of a system that includes an information processing device in accordance with an exemplary embodiment of the present invention.

FIG. 1 is a block diagram showing the structure of an information processing device in accordance with an exemplary embodiment of the present invention.

The system shown in FIG. 1 includes a server 1 and clients 2 and 3. The server 1 is connected to the clients 2 and 3 via a network 4. The server 1 includes a page/link database (DB) 5, a page data managing unit 6, a link information extracting unit 7 (the creating unit), a page weight calculating unit 8, a tag database (DB) 9, a tag managing unit 10, a tag weight calculating unit 11, a tag transmission determining unit 12, and a page data creating unit 13 (a page creating unit).

The page/link DB 5 stores sets of page data (hereinafter referred to simply as pages) constituting content, and link information indicating links between the pages. The page data managing unit 6 manages the associations of the pages with IDs of the pages (such as URLs: Uniform Resource Locator) and the link information.

The link information extracting unit 7 extracts the link information stored in the page/link DB 5, and creates interpage relationship data. The page weight calculating unit 8 calculates the weight of each of the pages having links from/to the subject page, based on the interpage relationship data created by the link information extracting unit 7.

The tag DB 9 stores tags and information related to the tags. The tag managing unit 10 manages the tag information, which includes the types of the tags attached to the pages, the tag registrations (the users who added tags to a page), and the number of tag registrations. The tag weight calculating unit 11 calculates the weight of each tag, based on the page weights calculated by the page weight calculating unit 8 and the tag information (such as the types of tags and the number of tag registrations) managed by the tag managing unit 10.

The tag transmission determining unit 12 determines which tags are to be transmitted to which pages, based on the weights of the tags calculated by the tag weight calculating unit 11. The page data creating unit 13 creates a new page having tags added to the pages, based on the determination results of the tag transmission determining unit 12. The clients 2 and 3 add tags to the pages, and show the new page created by the page data creating unit 13 on a display.

Figure 2:
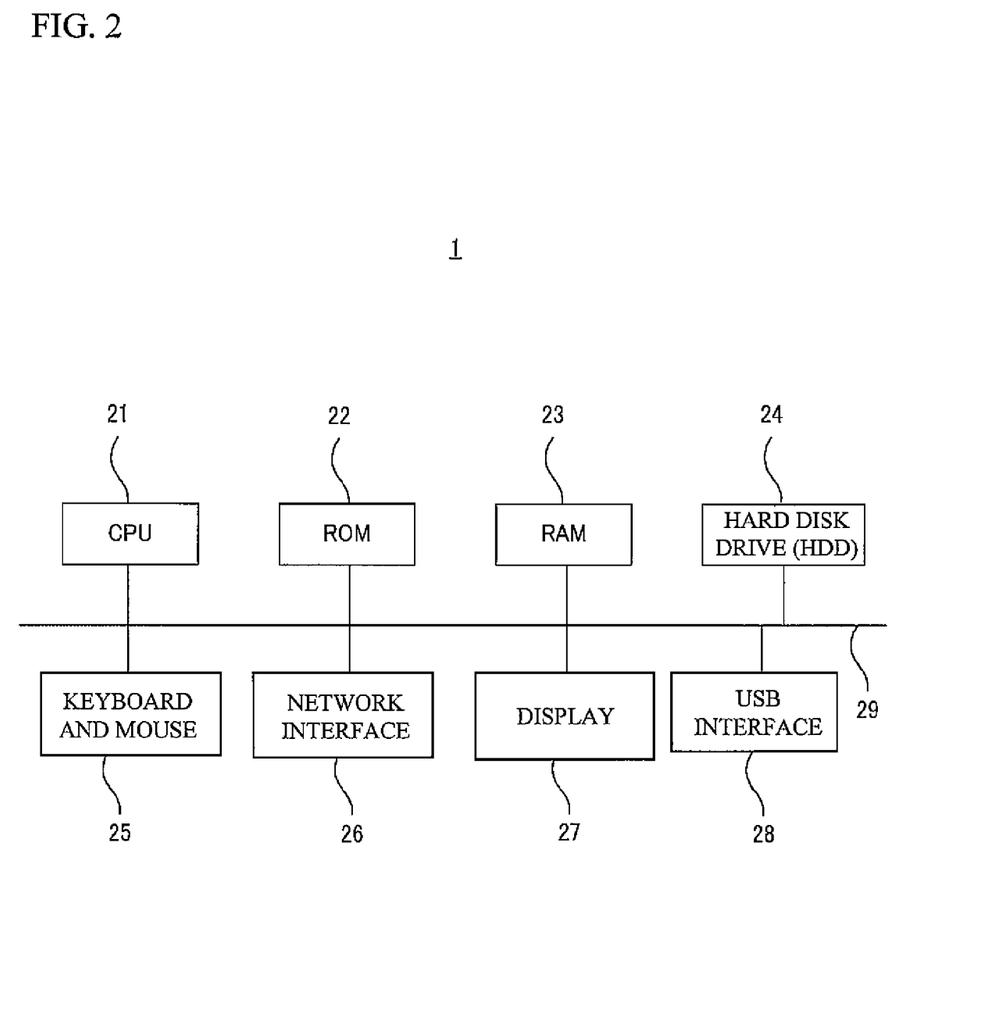
FIG. 2 is a block diagram showing the hardware structure of the server.

FIG. 2 is a block diagram showing the hardware structure of the server 1.

The server 1 includes a CPU 21 that controls the entire device, a ROM 22 that stores a control program, a RAM 23 that functions as a working area, a hard disk drive (HDD) 24 that stores various kinds of information and programs, a mouse and keyboard 25, a network interface 26 that connects to another computer, a display 27 that is a liquid crystal monitor or CRT, and a USB (universal serial bus) interface 28 that connects to an external device. The CPU 21 is connected to the ROM 22, the RAM 23, the hard disk drive (HDD) 24, the mouse and keyboard 25, the network interface 26, the display 27, and the USB interface 28 via a system bus 29.

The page data managing unit 6, the link information extracting unit 7, the page weight calculating unit 8, the tag managing unit 10, the tag weight calculating unit 11, the tag transmission determining unit 12, and the page data creating unit 13 are equivalent to the CPU 21 that performs various operations in accordance with the control program. The page/link DB 5 and the tag DB 9 are stored in the hard disk drive (HDD) 24. Since the hardware structure of each of the clients 2 and 3 is the same as the hardware structure of the server 1, explanation of it is omitted here.

Figure 3:
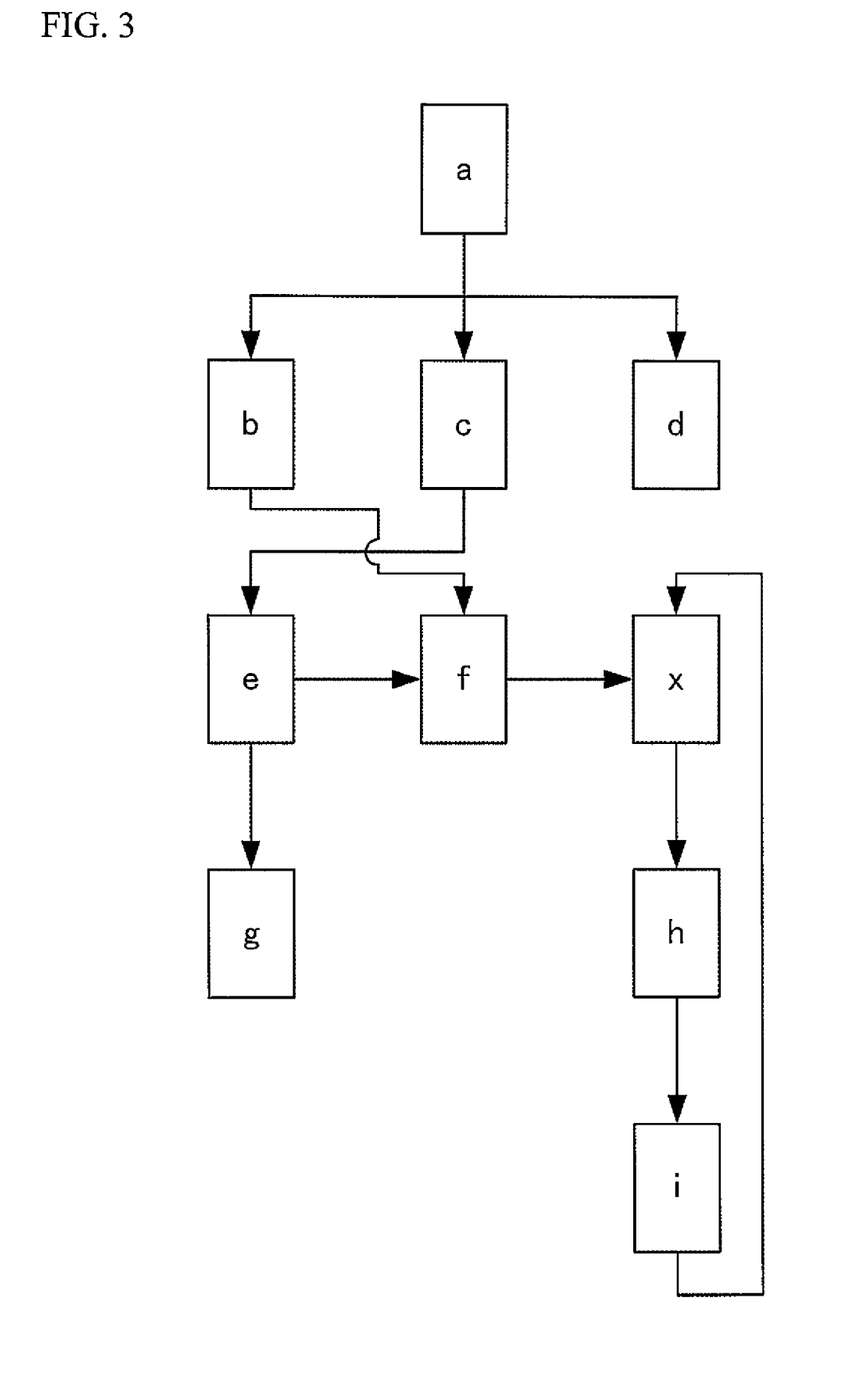
FIG. 3 shows an example of linkages between pages stored in the page/link DB.

FIG. 3 shows an example of the links among the pages stored in the page/link DB 5.

Page a links to pages b, c, and d. The page b links to page f. The page c links to page e, and the page e links to the page f and page g. The page f links to page x, and the page x links to page h. The page h links to page i, and the page i links to the page x.

Next, an operation to be performed by the link information extracting unit 7 shown in FIG. 1 is described in detail.

Figure 4A:
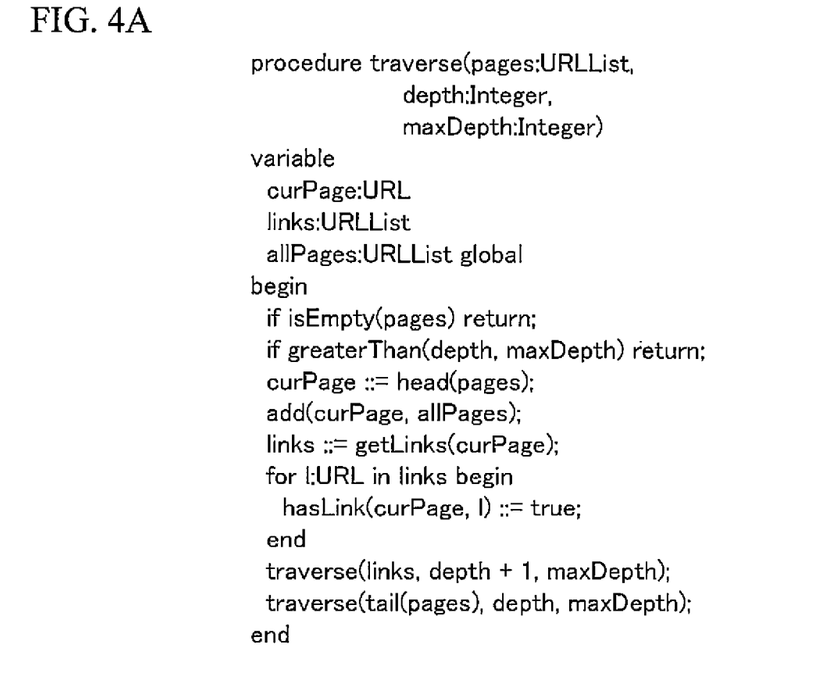
FIG. 4A shows an example of a link collection program.
Figure 4B:
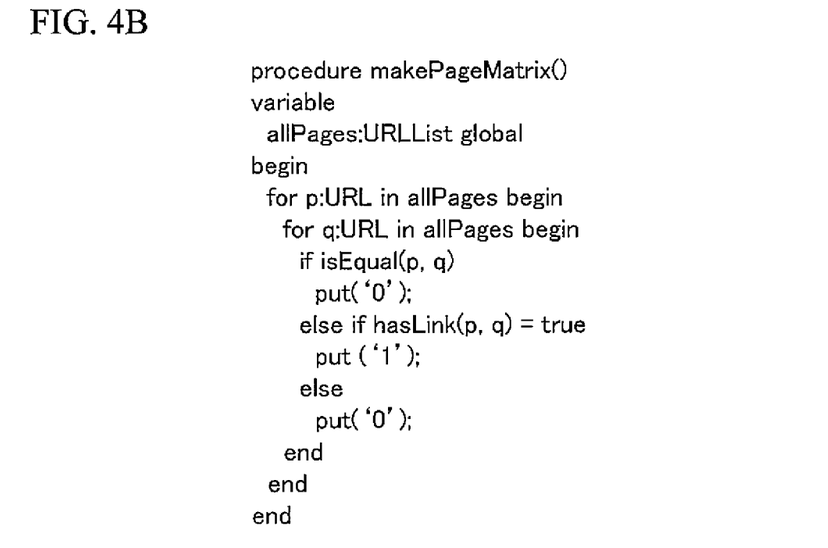
FIG. 4B shows an example of a matrix output program.

The link information extracting unit 7 has the link collection program shown in FIG. 4A and the matrix output program shown in FIG. 4B. By executing the link collection program shown in FIG. 4A, the link information extracting unit 7 collects the links of the pages, while tracing the links from the group of pages as a starting point to the depth of maxDepth. In this manner, the link information extracting unit 7 extracts the link information related to the pages. After that, the link information extracting unit 7 executes the matrix output program shown in FIG. 4B, so as to output the link information related to the pages in the form of a matrix.

Figure 5:
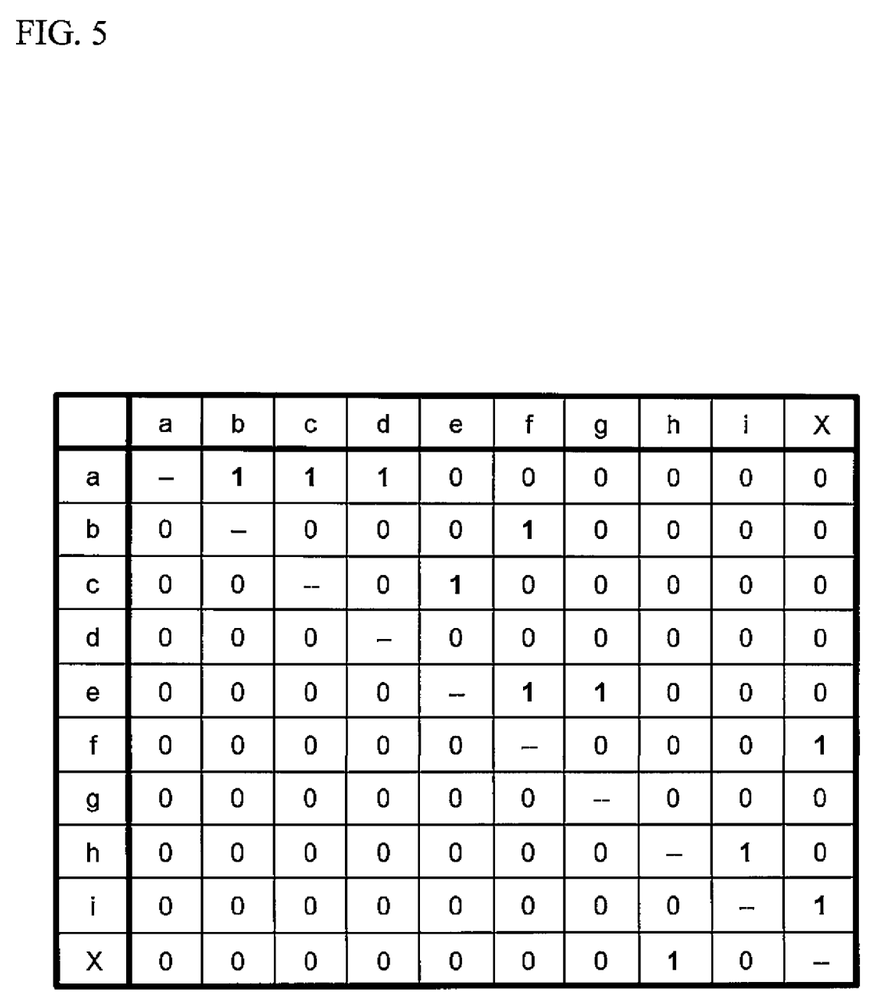
FIG. 5 shows an example of a matrix indicating the interpage link information obtained by the link information extracting unit executing the link collection program of FIG. 4A and the matrix output program of FIG. 4B with respect to the pages and the linkages shown in FIG. 3.

FIG. 5 shows a matrix P indicating the page link information that is obtained by the link information extracting unit 7 executing the link collection program of FIG. 4A and the matrix output program of FIG. 4B for the pages shown in FIG. 3 and the links between them. This matrix P is equivalent to the interpage relationship data.

Each "1" in the matrix P of FIG. 5 indicates that there is a link, and each "0" indicates that there is not a link. For example, as the page a of FIG. 3 links to the pages b, c, and d, "1" is input to each column of the pages b, c, and d with respect to the page a on the first row.

The link information extracting unit 7 can also calculate the distance between pages by calculating the power of the matrix P. More specifically, the link information extracting unit 7 calculates Pk (k=1 ... dim(P)). The distance between the page i and the page j is k, with which an element <i, j> becomes 1 for the first time. For example, an element <1, 10> becomes 1 with P3, and accordingly, the distance between the page a and the page x is 3. This indicates that three steps are required to reach the page x from the page a shown in FIG. 3.

Next, an operation to be performed by the page weight calculating unit 8 shown in FIG. 1 is described in detail.

The page weight calculating unit 8 calculates the weight wp of each of the pages (linking pages) having links from/to the subject page directly or indirectly, based on the interpage relationship data (or the matrix P) obtained from the link information extracting unit 7 and the following equation (1):

$$wp=(l_{in}+1)R/d \qquad (1)$$

where the variable d represents the shortest distance from the subject page, the variable $l_{in}$ represents the number of pages which link to each of the linking pages. The variable R represents the ratio of the number $l_r$ of links by which the each of the linking pages can reach to the subject page to the number $l_{out}$ of pages to which the each of the linking pages links. When the variable $l_{out}$ is larger than 0 ($l_{out}>0$), the variable R is $l_r/l_{out}$. When the variable lout is 0 ($l_{out}=0$), the variable R is 0.

Figure 6:
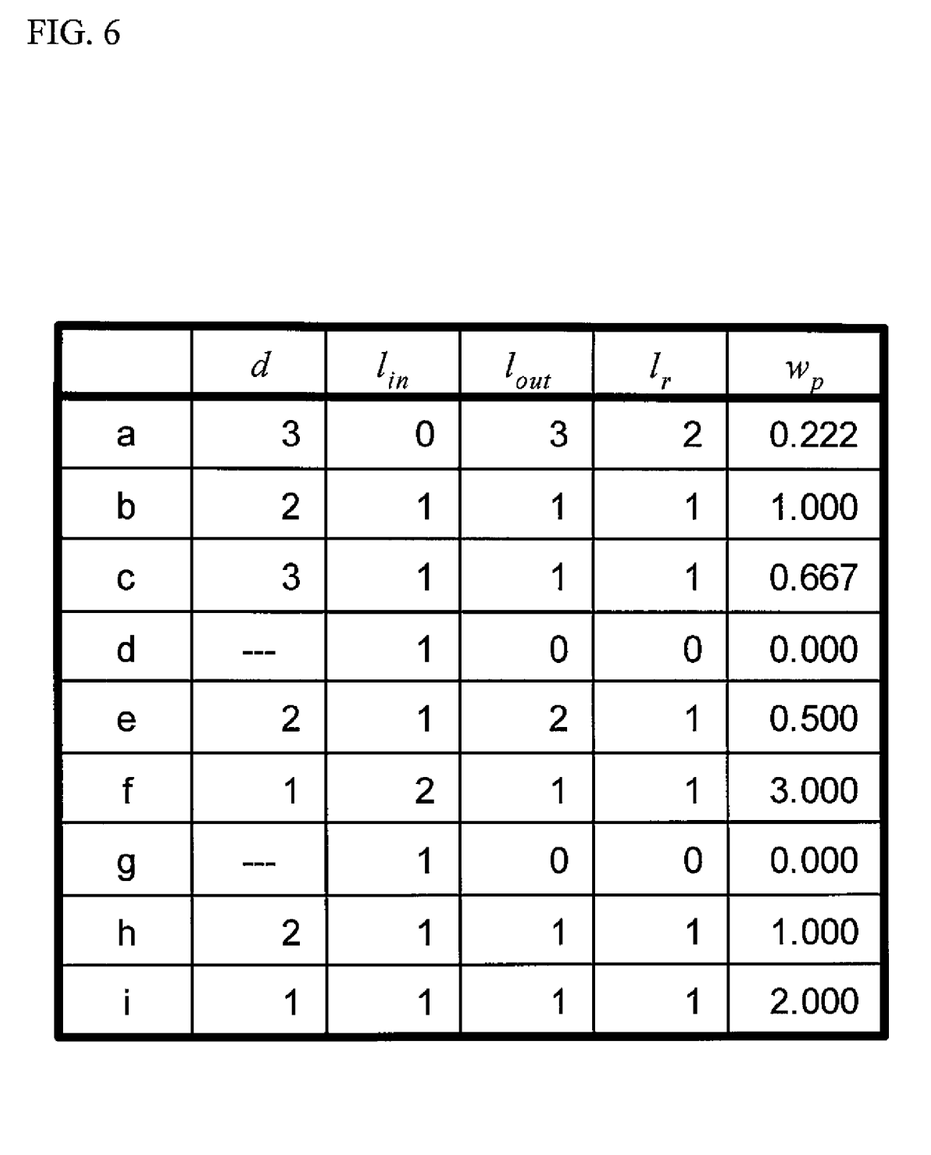
FIG. 6 shows the results of calculations performed by the page weight calculating unit calculating the page weights WP of the pages from which each page shown in FIG. 3 is liked.

FIG. 6 shows the results of calculations performed by the page weight calculating unit 8 to determine the weights wp of the linking pages having links from/to the subject page. Here, the subject page is the page x.

Figure 7:
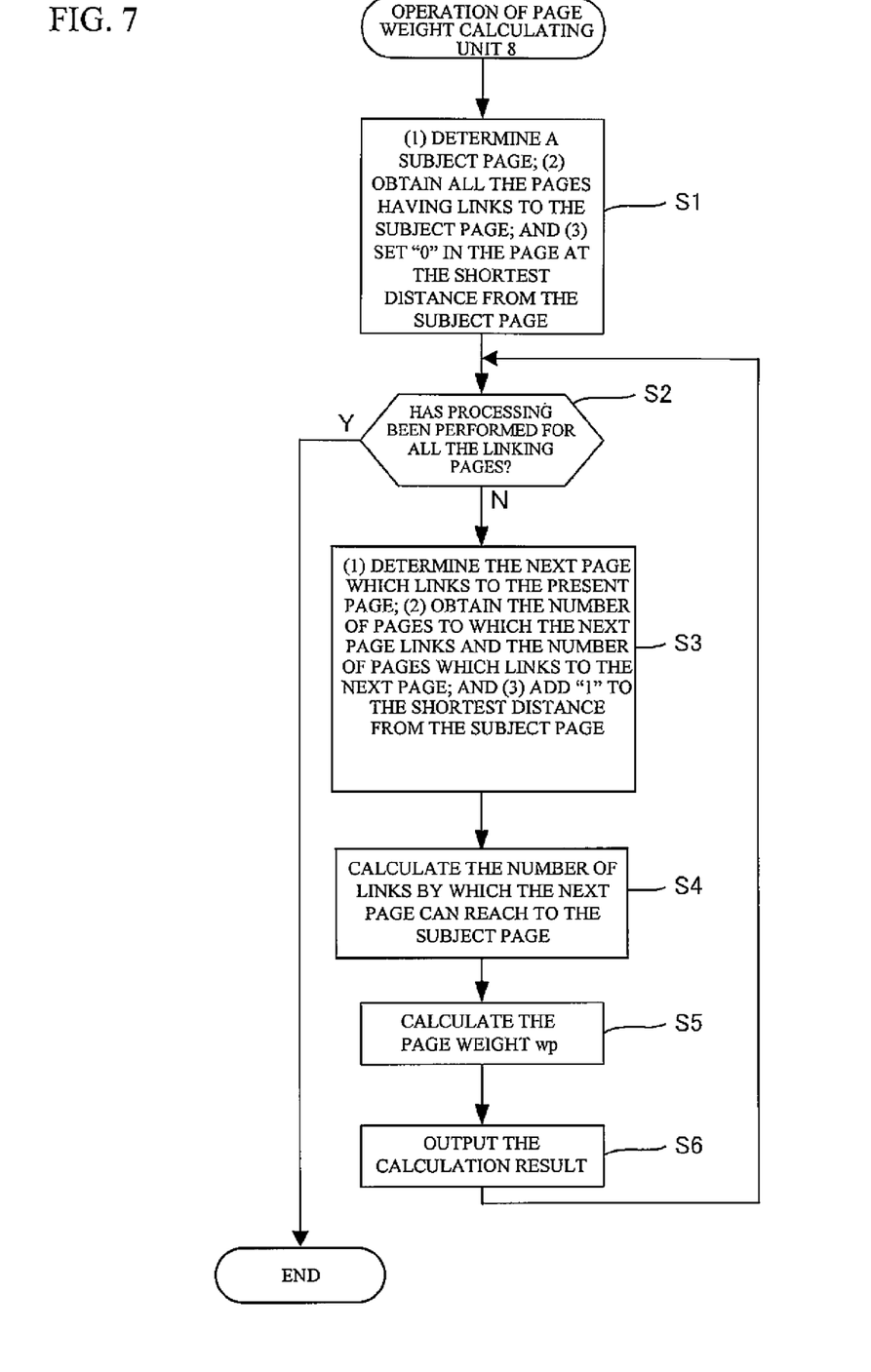
FIG. 7 is a flowchart showing an operation to be performed by the page weight calculating unit.

FIG. 7 is a flowchart showing the operation to be performed by the page weight calculating unit 8.

First, in step S1, the page weight calculating unit 8 determines the subject page, obtains all the linking pages, and sets "0" at the shortest distance from the subject page.

In step S2, the page weight calculating unit 8 determines whether processing has been performed on all the linking pages.

If "YES" in step S2, this operation comes to an end. If "NO" in step S2, the page weight calculating unit 8 moves on to step S3. In step S3, the page weight calculating unit 8 determines the next page which links to the subject page as a linking page for now, obtains the number of pages which link to the next page (equivalent to the variable $l_{in}$) and the number of pages to which the next page links (equivalent to the variable $l_{out}$), and increases the value of the shortest distance from the subject page by 1 (equivalent to the variable d).

In step S4, the page weight calculating unit 8 calculates the number of links through which the next page can reach to the subject page (equivalent to the variable $l_r$).

In step S5, the page weight calculating unit 8 calculates the weight wp of the page, using the variables obtained in steps S3 and S4 and the equation (1) designed to calculate the weight wp of a page. In step S6, the page weight calculating unit 8 outputs the calculation result, and returns to step S2.

Next, an operation to be performed by the tag weight calculating unit 11 shown in FIG. 1 is described in detail.

The tag weight calculating unit 11 calculates the weight wt of each tag by assigning the page weight calculated by the page weight calculating unit 8 and the tag information (the number of tag registrations in this case) managed by the tag managing unit 10 to the variables in the following equation (2):

$$wt=wp \log(t) \qquad (2)$$

where the variable wp represents the page weight, and the variable t represents the number of users who have added tags to pages.

Figure 8:
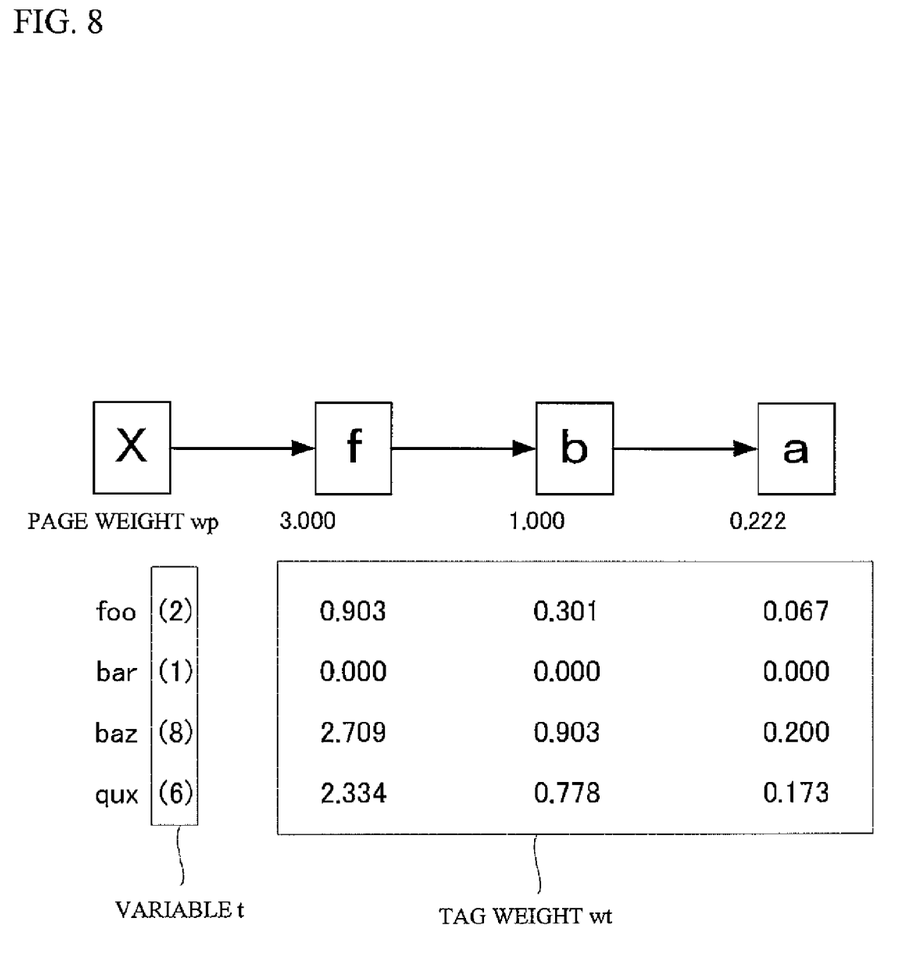
FIG. 8 shows the results of calculations of tag weights wt.

FIG. 8 shows the results of calculations of tag weights wt.

In FIG. 8, "foo", "bar", "baz", and "qux" are tags, and each numeric value in the brackets indicates the number (the variable t) of users who have added the tag to the page x. Meanwhile, "3.000", "1.000", and "0.222" attached to the page f, the page b, and the page a, respectively, are the weights (the variable wp) of the respective pages. When the tag weight calculating unit 11 calculates the weight wt of the tag "foo" with respect to the page f in accordance with the equation (2), for example, the weight wt of the tag "foo" with respect to the page f is "0.903".

Figure 9:
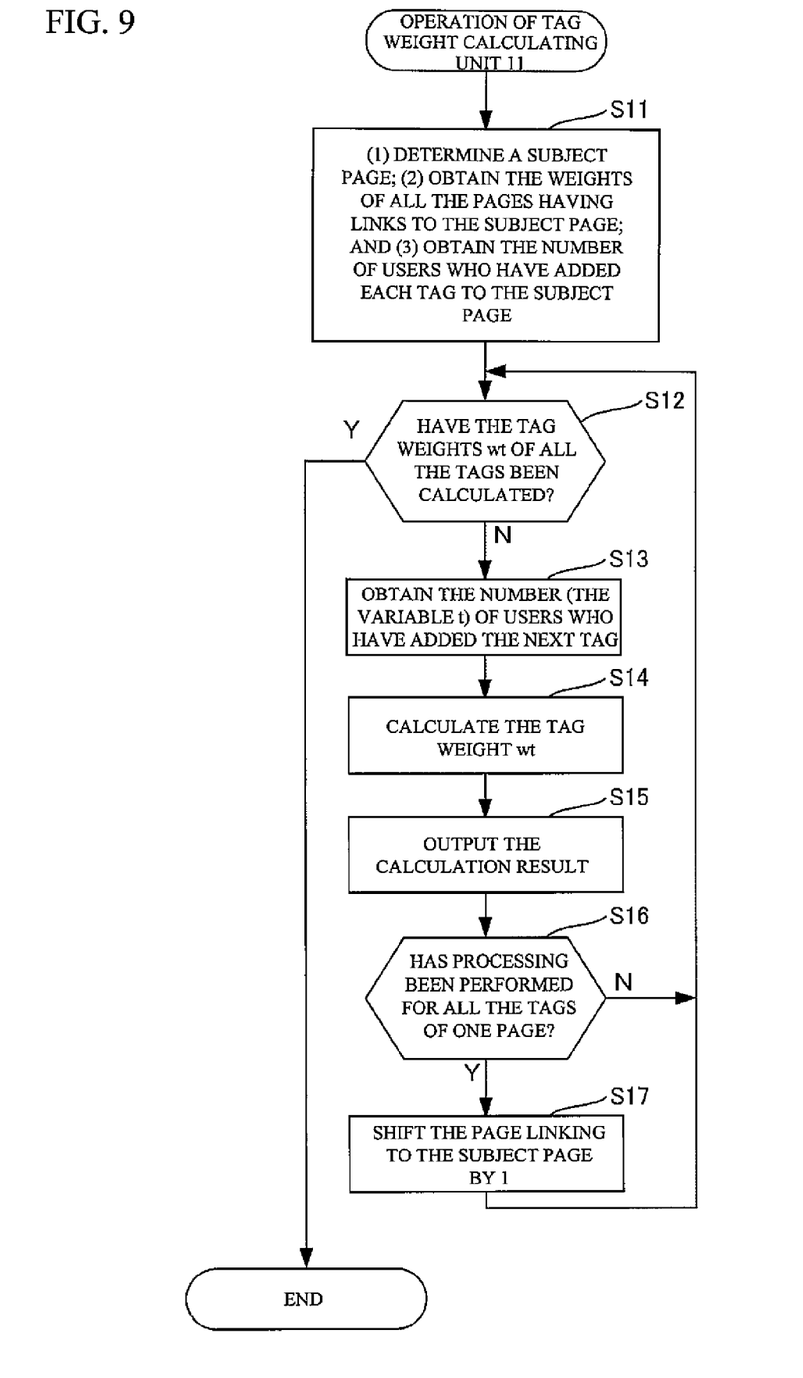
FIG. 9 is a flowchart showing an operation to be performed by the tag weight calculating unit.

FIG. 9 is a flowchart showing the operation to be performed by the tag weight calculating unit 11.

First, in step S11, the tag weight calculating unit 11 determines which page is to be the subject page, obtains the weights (the variables wp) of all the pages having links to the subject page, and obtains the number of users (the variable t) who have added each tag to the subject page.

In step S12, the tag weight calculating unit 11 determines whether the calculations of the weights wt of all the tags have been completed.

If "YES" in step S12, this operation comes to an end. If "NO" in step S12, the tag weight calculating unit 11 moves on to step S13. In step S13, the tag weight calculating unit 11 obtains the number of users (the variable t) who have added the next tag. When performing this operation for the first time, the tag weight calculating unit 11 obtains the number of users (the variable t) who have added a given tag.

In step S14, the tag weight calculating unit 11 calculates the tag weight wt, using the number of users (the variable t) obtained in step S13, the page weight (the variable wp) obtained in step S11, and the equation (2) for calculating the tag weight wt.

In step S15, the tag weight calculating unit 11 outputs the calculation result. In step S16, the tag weight calculating unit 11 determines whether the operation has been performed for all the tags for one page.

If "NO" in step S16, the tag weight calculating unit 11 returns to step S12. If "YES" in step S16, the tag weight calculating unit 11 moves on to step S17. In step S17, the tag weight calculating unit 11 shifts the page linking to the subject page by one, and returns to step S12.

Next, an operation to be performed by the tag transmission determining unit 12 shown in FIG. 1 is described in detail.

Based on the tag weights wt calculated by the tag weight calculating unit 11, the tag transmission determining unit 12 determines which tags are to be transmitted to which pages. For example, in a case where tags having a weight wt equal to or greater than a threshold value are to be transmitted (where tags having a tag weight of 0.5 or more in FIG. 8 are to be transmitted), the tag transmission determining unit 12 determines that the tags "foo", "baz", and "qux" are to be transmitted to the page f, and the tags "baz" and "qux" are to be transmitted to the page b. The threshold value can be changed through the mouse and keyboard 25.

Next, an operation to be performed by the page data creating unit 13 shown in FIG. 1 is described in detail.

Figure 10:
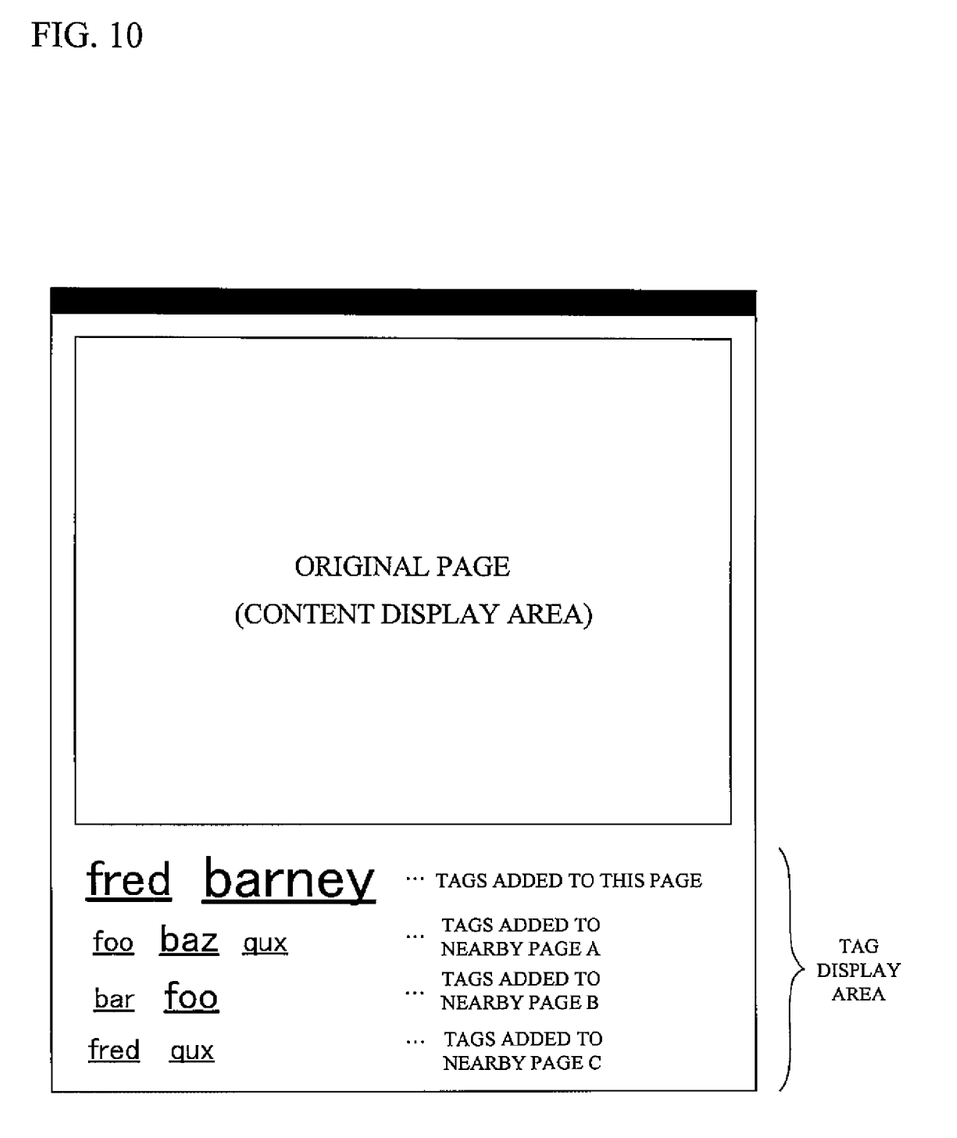
FIG. 10 shows an example of a new page created by the page data creating unit.

Based on the determination results of the tag transmission determining unit 12, the page data creating unit 13 creates a new page having tags added to a page. For example, in a case where the tag transmission determining unit 12 determines that the tags "foo", "baz", and "qux" are to be transmitted to the page f, the page data creating unit 13 creates a new page f having the tags "foo", "baz", and "qux" added to the page f. FIG. 10 shows an example of a new page that is created by the page data creating unit 13.

In FIG. 10, a tag display area is provided below the original page. Alternatively, the tag display area may be provided above the original page or either side of the original page. In the tag display area, the tags "fred" and "barney" added to the original page are displayed. Under those tags, there are the tags "foo", "baz", and "qux" transmitted from a nearby page A, the tags "bar" and "foo" transmitted from a nearby page B, and the tags "fred" and "qux" transmitted from a nearby page C. In the tag display area, the tags transmitted from each one page are displayed in a row different from the tags transmitted from each other page.

The number of registrations of each tag is reflected by its size in display. Alternatively, the page data creating unit 13 may change the color of each transmitted tag, depending on the distance between the page to which the tag is transmitted (the original page) and the page from which the tag is transmitted (the page to which the tag is first added). In this manner, each user who accidentally accesses a page to which a tag is transmitted can have a chance to notice the existence of the page from which the tag is transmitted. Also, for each page from which tags are to be transmitted, the page data creating unit 13 may determine the number of tags to be displayed in each page to which the tags are to be transmitted.

As described above in detail, in accordance with this exemplary embodiment, the link information extracting unit 7 extracts the link information from content, and creates the interpage relationship data. Based on the interpage relationship data, the page weight calculating unit 8 calculates the weights of linking pages. Based on the weights of the linking pages and the information about tags, the tag weight calculating unit 11 calculates the weights of the tags. Based on the tag weights, the tag transmission determining unit 12 determines which tags are to be transmitted to which pages. Based on the determination results of the tag transmission determining unit 12, the page data creating unit 13 creates a new page having added tags to each page.

Based on the page weights and the tag weights, tags are transmitted from a page to nearby pages. Accordingly, each user who accesses one of the nearby pages can have more chances to obtain information from the page. Also, since it is not necessary to designate a specific search word in this exemplary embodiment, information that cannot be found by a regular search method can be found. Furthermore, tags are automatically transmitted from a page to nearby pages, users do not need to access the nearby pages and register tags. Accordingly, there are no work burdens on the users.

Although tags may be registered anonymously in any page, the tags can still be automatically transmitted to nearby pages.

Figure 11A:
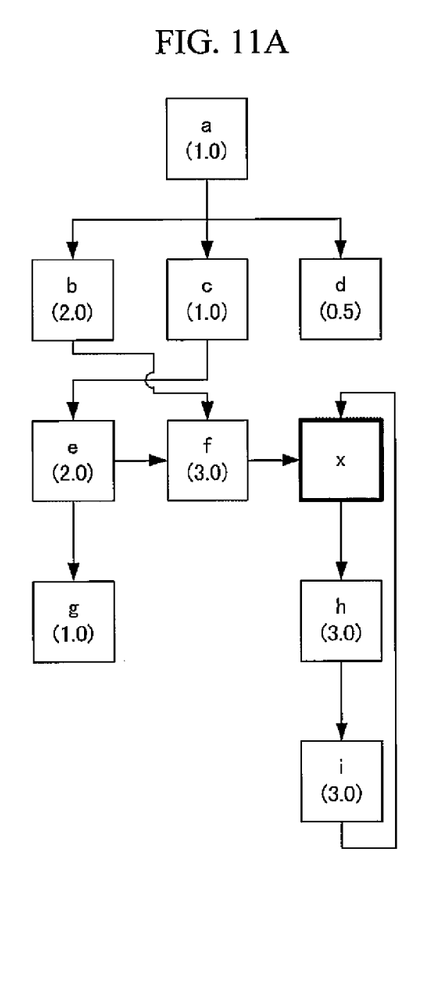
FIG. 11A shows an example case where a page weight wp is determined by the page weight calculating unit, based on the distance between the subject page and a page which links to the subject page.

In the above described exemplary embodiment, the page weight calculating unit 8 calculates page weights wp in accordance with the equation (1). However, the page weight calculating unit 8 may determine each page weight wp, based on the distance between the subject page and the page from which the subject page is linked, as shown in FIG. 11A. With the subject page being page x, the page weight wp decreases as the distance from the page x increases. In a case where there are two or more links from which the subject page can be reached, the page weight calculating unit 8 determines the page weight wp, based on the link at the shortest distance.

Figure 11B:
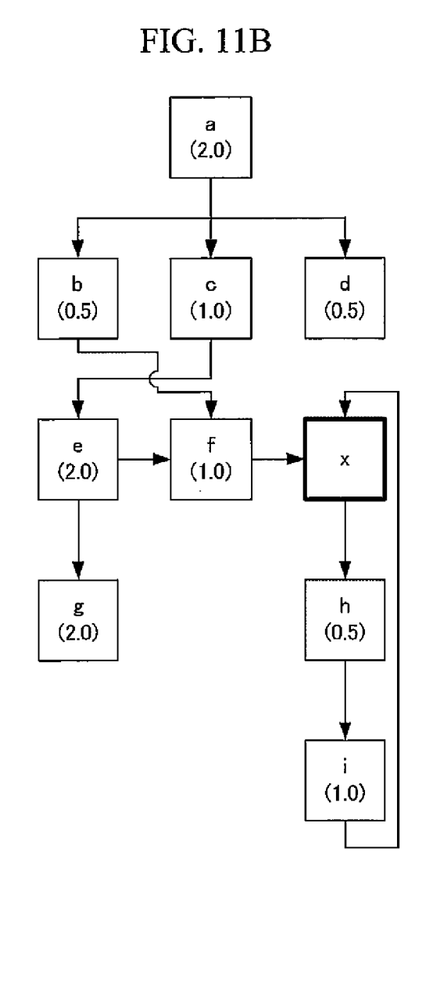
FIG. 11B shows an example case where a page weight wp is determined by the page weight calculating unit, based on the degree of similarity between the subject page and a linking page.
Figure 11C:
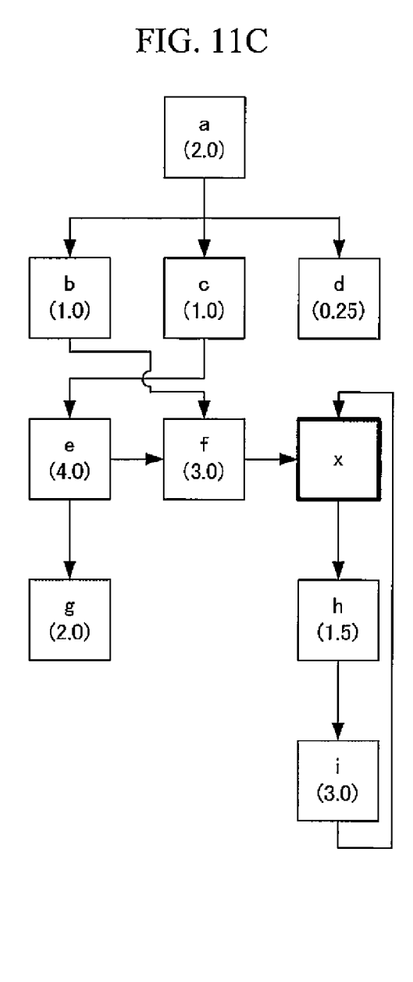
FIG. 11C shows an example case where a page weight wp is determined by the page weight calculating unit weighting the distance between the subject page and a linking page with the degree of similarity between the subject page and the linking page.

Also, the page weight calculating unit 8 may determine a page weight wp, based on the degree of similarity between the subject page and a linking page, as shown in FIG. 11B. Further, the page weight calculating unit 8 may set a page weight wp by weighting the distance between the subject page and a linking page with the degree of similarity between the subject page and the linking page, as shown in FIG. 11C. The numeric value in the brackets in each page shown in FIGS. 11A through 11C is an example of a page weight wp.

In the above described exemplary embodiment, the tag weight calculating unit 11 calculates a tag weight wt, using the number of users (the variable t) who have added the tag to the subject page, the page weight (the variable wp), and the equation (2). However, it is possible to use a numeric value defined by a user as the variable t. Also, the tag weight calculating unit 11 may use dictionary data such as a thesaurus stored in the HDD 24, and sets the variable t at the frequency of appearance of the tag added to the subject page in the dictionary data.

Also, the tag weight calculating unit 11 may automatically extract a proper noun or the like from the subject page, performing natural language processing. The tag weight calculating unit 11 may then create a tag, and set the variable t at the frequency of appearance of the created tag in dictionary data such as a thesaurus stored in the HDD 24.

Figure 12:
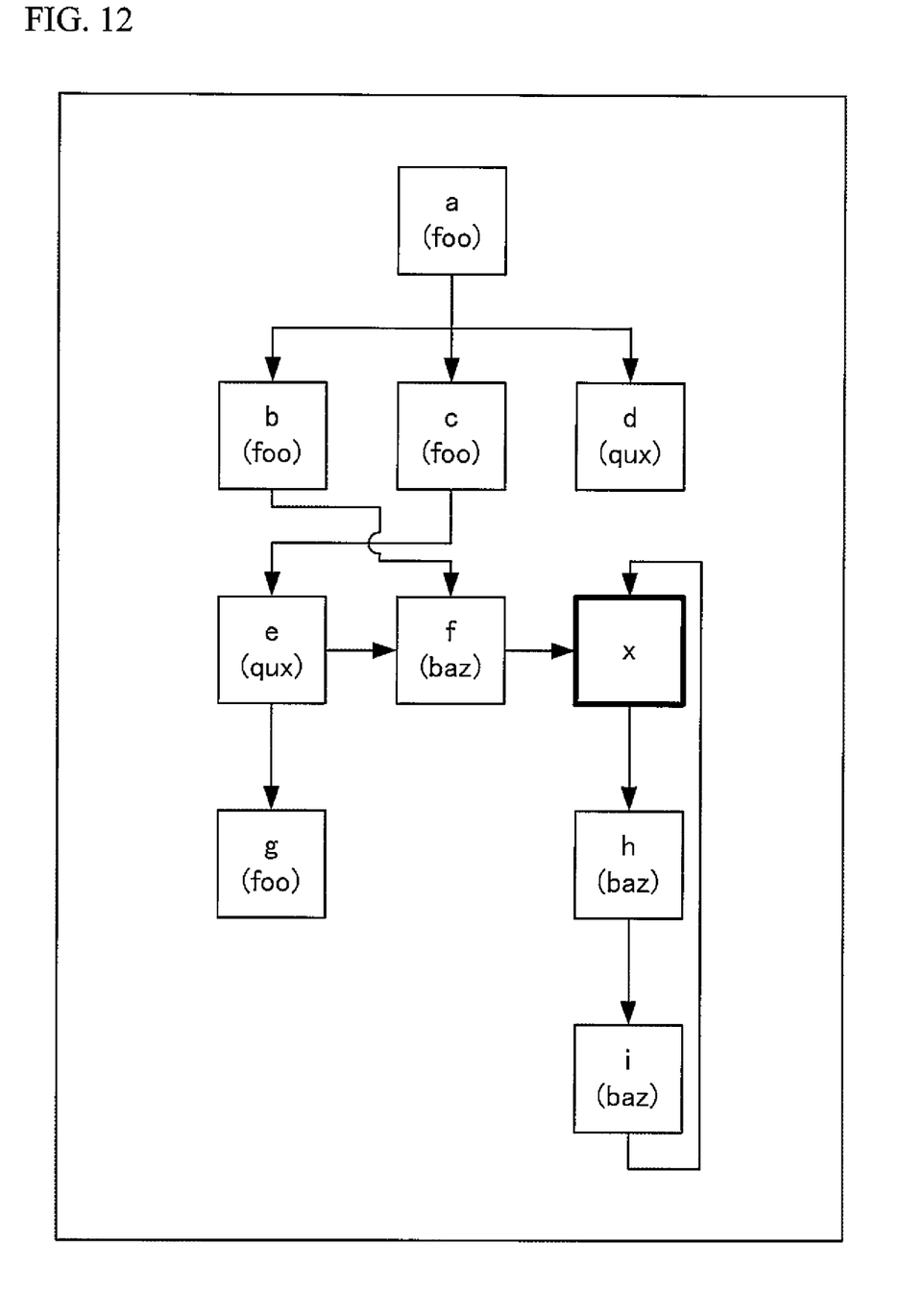
FIG. 12 shows an example of a page having a tag distribution displayed visually.

In the above described exemplary embodiment, the page data creating unit 13 may create a page having a tag distribution displayed visually, instead of creating a new page having tags added to a page. FIG. 12 shows an example of a page having a tag distribution displayed visually. The code in the brackets in each page indicates the representative tag of the page. With this arrangement, users can easily grasp the distribution of tags transmitted to nearby pages.

The same effects as those of the above described exemplary embodiment can be achieved by supplying a recording medium having a software program recorded thereon to realize the functions of the server 1, and reading and executing the program from the recording medium through the CPU of the server 1. The recording medium for supplying the program may be a CD-ROM, a DVD, or a SD card, for example.

The same effects as those of the above described exemplary embodiment can also be achieved by the CPU of the server 1 executing a software program for realizing the functions of the server 1.

It should be understood that the present invention is not limited to the above described exemplary embodiment, and various modifications may be made to them without departing from the scope of the invention.

What is claimed is:

1. An information processing device comprising:
    a creating unit that extracts link information from content, and creates interpage relationship data which includes information between a subject page and linking pages having links from/to the subject page directly or indirectly;
    a page weight calculating unit that calculates a weight of at least one of the linking pages, based on the interpage relationship data;
    a tag weight calculating unit that calculates a weight of a tag, based on the weight of the at least one of the linking pages and information about the tag;
    a tag transmission determining unit that determines whether the tag is to be transmitted to which page, based on the weight of the tag; and
    a page creating unit that creates a new page having the tag added to the subject page, based on the determination result of the tag transmission determining unit.

2. The information processing device according to claim 1, wherein:
    the interpage relationship data is a matrix that indicates linkages between pages; and
    the creating unit calculates the power of the matrix, so as to determine the distance between the pages.

3. The information processing device according to claim 1, wherein the page weight calculating unit calculates the weight of the at least one of the linking pages, by determining a shortest distance d from a subject page, the number $l_{in}$ of pages which link to the at least one of the linking pages, the number $l_{out}$ of pages to which the at least one of the linking pages links, the number $l_r$ of links by which the at least one of the linking pages is reachable to the subject page, and a ratio R of the number $l_r$ of links to the number $l_{out}$ of pages, and assigning those variables to the equation:

$$\text{page weight } wp=(l_{in}+1)R/d.$$

4. The information processing device according to claim 1, wherein the page weight calculating unit calculates the weight of the page which links to the subject page, based on one of a distance between the subject page and the page which links to the subject page, a degree of similarity between the subject page and the page which links to the subject page, and a value obtained by weighting the distance between the subject page and the page which links to the subject page with the degree of similarity between the subject page and the page which links to the subject page.

5. The information processing device according to claim 1, wherein the tag weight calculating unit calculates the weight of a tag by assigning the page weight wp calculated by the page weight calculating unit and the number t of users who have added the tag to pages, to the equation:

$$\text{each tag weight } wt=wp\log(t).$$

6. The information processing device according to claim 1, wherein the tag weight calculating unit calculates the weight of a tag by assigning the page weight wp calculated by the page weight calculating unit and the frequency t of appearance of the tag added to a subject page in predetermined data, to the equation:

$$\text{each tag weight } wt=wp\log(t).$$

7. The information processing device according to claim 6, wherein the tag weight calculating unit automatically extracts tags from the subject page, and adds the extracted tags to the subject page.

8. The information processing device according to claim 1, wherein the page creating unit creates a page having a tag distribution displayed visually, based on determination results of the tag transmission determining unit.

9. The information processing device according to claim 1, wherein the page creating unit changes color of a tag to be added to the new page, depending on a distance between a page to which the tag is transmitted and a page from which the tag is transmitted.

10. The information processing device according to claim 1, wherein the tag is added to a page by a user.

11. A computer readable recording medium causing a computer to execute a process for processing information, the process comprising:
    creating interpage relationship data by extracting link information from content, the interpage relationship data including information between a subject page and linking pages having links from/to the subject page directly or indirectly;
    calculating a weight of at least one of the linking pages, based on the interpage relationship data;
    calculating a weight of a tag, based on the weight of the at least one of the linking pages and information about the tag;
    determining whether the tag is to be transmitted to which page, based on the weight of the tag; and
    creating a new page having the tag added to the subject page, based on the tag transmission determination result.

12. The process for processing information according to claim 11, wherein the tag is added to a page by a user.

13. An information processing method comprising:
    creating interpage relationship data by extracting link information from content, the interpage relationship data including information between a subject page and linking pages having links from/to the subject page directly or indirectly;
    calculating a weight of at least one of the linking pages, based on the interpage relationship data;

calculating a weight of a tag, based on the weight of the at least one of the linking pages and information about the tag;

determining whether the tag is to be transmitted to which page, based on the weight of the tag; and creating a new page having the tag added to the subject page, based on the tag transmission determination result.

14. The information processing method according to claim 13, wherein the tag is added to a page by a user.

* * * * *